US011590994B2

(12) United States Patent
DeBry (10) Patent No.: US 11,590,994 B2
(45) Date of Patent: Feb. 28, 2023

(54) FOLDABLE BEACH WAGON (71) Applicant: Radio Flyer Inc., Chicago, IL (US)

(72) Inventor: Garrett DeBry, Chicago, IL (US)

(73) Assignee: Radio Flyer Inc., Chicago, IL (US)

(*) Notice: Subject to any disclaimer, the term of this patent is extended or adjusted under 35 U.S.C. 154(b) by 0 days.

(21) Appl. No.: 16/993,367

(22) Filed: Aug. 14, 2020

(65) Prior Publication Data
US 2021/0046963 A1 Feb. 18, 2021

Related U.S. Application Data (60) Provisional application No. 62/887,665, filed on Aug. 15, 2019.

(51) Int. Cl.
*B62B 3/02* (2006.01)
*B62B 3/04* (2006.01)
*B62B 3/00* (2006.01)
*B62B 5/00* (2006.01)
*B62B 5/06* (2006.01)

(52) U.S. Cl.
CPC .............. *B62B 3/002* (2013.01); *B62B 3/001* (2013.01); *B62B 3/02* (2013.01); *B62B 3/04* (2013.01); *B62B 5/0013* (2013.01); *B62B 5/06* (2013.01); *B62B 2203/04* (2013.01); *B62B 2301/04* (2013.01)

(58) Field of Classification Search
CPC ........... B62B 3/002; B62B 3/001; B62B 3/02; B62B 3/04; B62B 5/0013; B62B 5/06; B62B 2203/04; B62B 2301/04
See application file for complete search history.

(56) References Cited

U.S. PATENT DOCUMENTS 1,371,198 A  3/1921  Daum
1,465,211 A  8/1923  Dunkelberger
(Continued)

FOREIGN PATENT DOCUMENTS

CN  102166068 B  5/2013
CN  205554238  9/2016
(Continued)

OTHER PUBLICATIONS

International Search Report and Written Opinion issued to PCT/US20/56827, dated Jan. 21, 2021 (16 pages).
International Preliminary Report on Patentability issued to PCT/US20/56827, dated May 5, 2022 (9 pages).
(Continued)

*Primary Examiner* — John D Walters
(74) *Attorney, Agent, or Firm* — Barnes & Thornburg LLP (57) ABSTRACT A foldable beach wagon with steerable front wheels is disclosed. The wagon has a frame having a first end assembly, an opposing second end assembly and a floor assembly connected between the first end assembly and the second end assembly. A steering link is pivotally connected to the wagon frame adjacent the first end assembly, and a handle is pivotally connected to the steering link. When the steering link is pivoted by the handle a tie rod moves laterally to pivot the front wheels for turning the wagon. A hanger assembly is connected to the wagon frame adjacent the second end assembly. The hangar assembly is adapted to receive one or more chairs. Fenders are provided over the rear wheels to block engagement of the chairs with the rear wheels of the wagon.

17 Claims, 9 Drawing Sheets

(56) References Cited

U.S. PATENT DOCUMENTS

| | | |
|---|---|---|
| 1,489,443 A | 4/1924 | Kelly |
| 1,771,813 A | 7/1930 | Norman |
| 1,820,466 A | 8/1931 | Lieblein |
| 2,020,766 A | 11/1935 | Brown Reinhardt |
| 2,471,553 A | 5/1949 | Zuckerman |
| 2,563,995 A | 8/1951 | East |
| 2,575,189 A | 11/1951 | Schmidt |
| 2,942,679 A | 6/1960 | Gibson |
| 2,984,514 A | 5/1961 | Lemley |
| 2,989,318 A | 6/1961 | Schenkman |
| 3,116,935 A | 1/1964 | Mitchin et al. |
| 3,162,460 A | 12/1964 | Davidson |
| 3,893,532 A | 7/1975 | Perlowin |
| 4,227,709 A | 10/1980 | Gradwohl et al. |
| 4,449,322 A | 5/1984 | Blumenthal |
| 4,706,986 A | 11/1987 | Kassai |
| 4,735,426 A | 4/1988 | McConnell |
| 4,741,552 A | 5/1988 | Kassai |
| 4,746,140 A | 5/1988 | Kassai |
| 4,763,907 A | 8/1988 | Raymond |
| 4,796,909 A | 1/1989 | Kirkendall |
| 4,811,968 A | 3/1989 | Bolden |
| 4,824,137 A | 4/1989 | Bolden |
| 4,844,493 A | 7/1989 | Kramer |
| 4,856,810 A | 8/1989 | Smith |
| 4,878,682 A | 11/1989 | Lee |
| 4,887,836 A | 12/1989 | Simjian |
| 5,050,900 A | 9/1991 | Lee |
| 5,333,893 A | 8/1994 | Chen |
| 5,360,222 A | 11/1994 | Bro et al. |
| 5,423,592 A | 6/1995 | Spurrier et al. |
| 5,538,267 A | 7/1996 | Pasin et al. |
| 5,657,828 A | 8/1997 | Nagamachi |
| 5,699,647 A | 12/1997 | Weder et al. |
| 5,746,282 A | 5/1998 | Fujiwara et al. |
| 5,806,864 A | 9/1998 | Zielinski et al. |
| 5,833,251 A | 11/1998 | Peck |
| 5,857,695 A | 1/1999 | Crowell |
| 5,876,049 A | 3/1999 | Spear et al. |
| 5,911,432 A | 6/1999 | Song |
| 5,915,723 A | 6/1999 | Austin |
| 5,947,493 A | 9/1999 | Pasin et al. |
| 5,957,482 A | 9/1999 | Shorter |
| 6,010,145 A | 1/2000 | Liu |
| 6,079,720 A | 6/2000 | Spear et al. |
| 6,079,777 A | 6/2000 | Simmons et al. |
| 6,142,491 A | 11/2000 | Darling, III |
| 6,164,671 A | 12/2000 | Darling, III |
| 6,220,611 B1 | 4/2001 | Shapiro |
| 6,270,092 B2 | 8/2001 | Darling, III |
| 6,276,471 B1 | 8/2001 | Kratzenberg et al. |
| 6,318,740 B1 | 11/2001 | Nappo |
| D458,648 S | 6/2002 | Chiappetta et al. |
| 6,488,293 B1 | 12/2002 | Mitchell et al. |
| 6,491,318 B1 | 12/2002 | Galt et al. |
| 6,499,750 B1 | 12/2002 | Michelau |
| 6,536,796 B1 | 3/2003 | Solomon |
| 6,561,529 B2 | 5/2003 | Darling, III |
| 6,581,945 B1 | 6/2003 | Shapiro |
| 6,629,574 B2 | 10/2003 | Turner |
| D483,419 S | 12/2003 | Chiappetta et al. |
| 6,663,139 B1 | 12/2003 | Smith |
| 6,733,026 B1 | 5/2004 | Robberson et al. |
| 6,845,991 B1 | 1/2005 | Ritucci et al. |
| 6,893,030 B2 | 5/2005 | Shapiro |
| 6,916,028 B2 | 7/2005 | Shapiro |
| 6,932,365 B2 | 8/2005 | Chiappetta et al. |
| 7,017,939 B2 | 3/2006 | Darling, III |
| 7,066,485 B2 | 6/2006 | Shapiro |
| 7,097,182 B1 | 8/2006 | Liu |
| 7,118,115 B2 | 10/2006 | Abel |
| 7,150,339 B2 | 12/2006 | Liao et al. |
| 7,150,465 B2 | 12/2006 | Darling, III |
| 7,163,213 B2 | 1/2007 | Chambers |
| 7,210,545 B1 | 5/2007 | Waid |
| 7,226,059 B1 | 6/2007 | Samuels |
| D547,812 S | 7/2007 | Seckel et al. |
| 7,284,797 B2 | 10/2007 | Huang |
| D566,200 S | 4/2008 | Seckel et al. |
| D570,424 S | 6/2008 | Blair |
| D573,663 S | 7/2008 | Ogawa |
| 7,392,994 B2 | 7/2008 | Darling, III |
| 7,407,177 B2 | 8/2008 | Darling, III |
| 7,461,857 B2 | 12/2008 | Darling, III |
| 7,475,900 B2 | 1/2009 | Cheng |
| 7,487,977 B2 | 2/2009 | Johnson |
| 7,490,684 B2 | 2/2009 | Seymour et al. |
| 7,523,955 B2 | 4/2009 | Blair |
| 7,547,037 B2 | 6/2009 | Poppinga et al. |
| 7,562,897 B1 | 7/2009 | Sherman et al. |
| 7,584,985 B2 | 9/2009 | You et al. |
| 7,661,156 B2 | 2/2010 | Thorne et al. |
| 7,709,795 B2 | 5/2010 | Yamanaka et al. |
| 7,731,221 B2 | 6/2010 | Bess |
| 7,775,530 B2 | 8/2010 | Darling, III |
| 7,823,906 B2 | 11/2010 | Darling, III |
| 7,836,530 B2 | 11/2010 | Thorne et al. |
| 8,011,686 B2 * | 9/2011 | Chen ..................... B62B 3/106 |
| | | 280/87.01 |
| 8,060,959 B2 | 11/2011 | Thorne et al. |
| 8,091,916 B2 | 1/2012 | Shapiro |
| 8,120,190 B2 | 2/2012 | Bravo |
| 8,127,392 B2 | 3/2012 | Wilson |
| 8,191,907 B2 | 6/2012 | Watson |
| 8,220,824 B2 | 7/2012 | Chen et al. |
| 8,286,739 B2 | 10/2012 | Oliphant |
| 8,297,642 B2 | 10/2012 | Tyson, III |
| 8,388,015 B2 | 3/2013 | Chen |
| 8,456,771 B2 | 6/2013 | Weber et al. |
| 8,458,829 B2 | 6/2013 | Thorne et al. |
| 8,490,732 B2 | 7/2013 | Sugimoto et al. |
| 8,556,740 B1 | 10/2013 | Schneider |
| 8,672,081 B2 | 3/2014 | Kume et al. |
| 8,746,377 B1 | 6/2014 | Dunbar |
| 8,746,710 B2 | 6/2014 | Schejbal |
| 8,851,503 B2 | 10/2014 | Tyson, III |
| 8,944,459 B1 | 2/2015 | Hagy |
| 8,955,855 B2 | 2/2015 | Herlitz et al. |
| D723,762 S | 3/2015 | Treadwell |
| 8,973,940 B2 | 3/2015 | Chen et al. |
| 9,033,361 B2 | 5/2015 | Frankel et al. |
| 9,045,152 B2 | 6/2015 | Sekine et al. |
| 9,056,621 B1 | 6/2015 | Jin et al. |
| 9,073,564 B2 | 7/2015 | Yang et al. |
| 9,108,656 B1 | 8/2015 | Nolan et al. |
| D738,436 S | 9/2015 | Cummings |
| 9,145,154 B1 | 9/2015 | Horowitz |
| 9,187,109 B2 * | 11/2015 | Treadwell ................. B62B 3/02 |
| 9,211,897 B2 | 12/2015 | Yang et al. |
| 9,242,663 B1 | 1/2016 | Nolan et al. |
| D748,739 S | 2/2016 | Horowitz |
| 9,327,749 B2 | 5/2016 | Young et al. |
| 9,365,225 B2 | 6/2016 | Henao |
| D763,532 S | 8/2016 | Huang |
| 9,580,095 B2 | 2/2017 | Vargas, II et al. |
| 9,738,298 B1 | 8/2017 | Yang et al. |
| 10,081,380 B2 | 9/2018 | Fitzwater et al. |
| 10,392,042 B2 | 8/2019 | Fitzwater et al. |
| 10,457,310 B2 * | 10/2019 | Sturgeon ................. B62B 3/106 |
| 2003/0025301 A1 | 2/2003 | Banuelos, III |
| 2003/0227158 A1 | 12/2003 | Kassai et al. |
| 2004/0164512 A1 | 8/2004 | Gunter et al. |
| 2004/0238469 A1 | 12/2004 | Ng |
| 2005/0275195 A1 | 12/2005 | Matula et al. |
| 2006/0119056 A1 | 6/2006 | Olsen |
| 2007/0258435 A1 | 11/2007 | Saito et al. |
| 2007/0284900 A1 | 12/2007 | Sze |
| 2008/0041644 A1 | 2/2008 | Tudek et al. |
| 2008/0073880 A1 | 3/2008 | Bess |
| 2008/0217886 A1 | 9/2008 | Poppinga et al. |
| 2009/0066114 A1 | 3/2009 | Molton |
| 2009/0161150 A1 | 6/2009 | Yu et al. |
| 2010/0090444 A1 | 4/2010 | Chen et al. |
| 2010/0123294 A1 | 5/2010 | Ellington et al. |

(56) References Cited

U.S. PATENT DOCUMENTS

| | | |
|---|---|---|
| 2010/0140902 A1 | 6/2010 | Zehfuss |
| 2010/0156069 A1 | 6/2010 | Chen |
| 2011/0025005 A1 | 2/2011 | Howell |
| 2011/0204598 A1 | 8/2011 | Stevenson |
| 2012/0211970 A1 | 8/2012 | Saito et al. |
| 2012/0235372 A1 | 9/2012 | Herlitz et al. |
| 2012/0274052 A1 | 11/2012 | Zhu |
| 2013/0179016 A1 | 7/2013 | Gale |
| 2013/0239322 A1 | 9/2013 | Thorne et al. |
| 2014/0001735 A1 | 1/2014 | Yang et al. |
| 2014/0196968 A1 | 7/2014 | Bieler et al. |
| 2014/0353945 A1 | 12/2014 | Young et al. |
| 2015/0035258 A1 | 2/2015 | Chen et al. |
| 2015/0053042 A1 | 2/2015 | Shirakawa et al. |
| 2015/0084298 A1 | 3/2015 | Herlitz et al. |
| 2015/0145224 A1 | 5/2015 | Zhu |
| 2015/0151771 A1 | 6/2015 | Jin et al. |
| 2015/0274186 A1 | 10/2015 | Treadwell |
| 2016/0347338 A1 | 12/2016 | Vargas, II et al. |
| 2019/0185038 A1 | 6/2019 | Choi |

FOREIGN PATENT DOCUMENTS

| | | |
|---|---|---|
| CN | 205554238 U  * | 9/2016 |
| CN | 107848551 | 3/2018 |
| GB | 190407310 A | 8/1904 |
| JP | 2001-1706 | 1/2001 |
| JP | 2009-137521 | 6/2009 |
| JP | 2010-184696 | 1/2021 |

OTHER PUBLICATIONS

International Search Report and Written Opinion issued to PCT/US20/24924, dated Jan. 11, 2021 (17 pages).

Office Action issued to CN202010819259.4, dated Oct. 27, 2022 (3 pages).

* cited by examiner

FOLDABLE BEACH WAGON

CROSS-REFERENCE TO RELATED APPLICATIONS

This application claims the benefit of U.S. Provisional Patent Application No. 62/887,665 filed Aug. 15, 2019, which is expressly incorporated herein by reference and made a part hereof.

FEDERALLY SPONSORED RESEARCH OR DEVELOPMENT

Not Applicable.

TECHNICAL FIELD

The present disclosure relates generally to wagons, and more specifically to a foldable wagon useful for the beach that converts from an open or use configuration to a folded configuration for transportation or storage.

BACKGROUND

Wagons, including folding wagons, are well known in the art. While such wagons according to the prior art provide a number of advantages, they nevertheless have certain limitations, including often having complex, heavy and expensive frames. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY

According to certain aspects of the present disclosure, the disclosed subject technology relates to a foldable wagon that is convertible from an open, unfolded or use position (i.e., an open configuration) to a closed or folded position (i.e., a closed configuration).

The disclosed technology further relates to a foldable beach wagon comprising: a wagon frame having a first end assembly and an opposing second end assembly; a floor assembly connected to the wagon frame between the first end assembly and the second end assembly, wherein the wagon frame folds between an open configuration and a folded configuration; first and second rear wheels rotatably connected to the wagon frame adjacent the second end assembly; first and second front wheels rotatably and pivotally connected to the wagon frame adjacent the first end assembly; a steering link pivotally connected to the wagon frame adjacent the first end assembly; a handle pivotally connected to the steering link; a tie rod connected to the steering link, the tie rod having a first end connected to the first front wheel and a second end connected to the second front wheel, wherein the tie rod moves laterally as the steering link is pivoted by the handle to pivot the first and second front wheels for turning the wagon; a hanger assembly connected to the wagon frame adjacent the second end assembly, the hangar assembly adapted to receive one or more chairs; and, a first fender over the first rear wheel and a second fender over the second rear wheel to block engagement of the one or more chairs with the rear wheels of the wagon.

The disclosed technology further relates to a beach wagon comprising: a wagon frame having a first end assembly and an opposing second end assembly; a floor assembly connected to the wagon frame between the first end assembly and the second end assembly; first and second rear wheels rotatably connected to the wagon frame adjacent the second end assembly; first and second front wheels rotatably connected to the wagon frame adjacent the first end assembly; a hanger assembly connected to the wagon frame adjacent the second end assembly, the hangar assembly adapted to receive one or more chairs; and, a first fender over the first rear wheel and a second fender over the second rear wheel to block engagement of the one or more chairs with the rear wheels of the wagon.

The disclosed technology further relates to a beach wagon comprising: a wagon frame having a first end and an opposing second end; first and second rear wheels rotatably connected to the wagon frame adjacent the second end; first and second front wheels rotatably connected to the wagon frame adjacent the first end; a hanger assembly connected to the wagon frame adjacent the second end and adapted to receive one or more chairs, wherein the hangar assembly comprises a hanger bar to support the one or more chairs, and a pivot mount connected to the wagon frame to selectively lock the hangar bar in a collapsed position and in a support position; and, a first fender over the first rear wheel and a second fender over the second rear wheel to block engagement of the one or more chairs with the rear wheels of the wagon.

The disclosed technology further relates to a beach wagon, further comprising a flexible wall housing around the frame of the wagon, and a flexible floor housing over the floor assembly, wherein the flexible floor housing has a screen around a perimeter thereof to allow sand to filter therethrough.

The disclosed technology further relates to a beach wagon, wherein the hangar assembly comprises a hangar bar to support the one or more chairs, and a pivot mount connected to the wagon frame to selectively lock the hangar bar in a collapsed position and in a support position.

The disclosed technology further relates to a beach wagon, further comprising a removable canopy connected to telescoping posts that are secured to the wagon frame.

The disclosed technology further relates to a beach wagon, wherein the steering link is pivotable in a first direction, wherein the handle is pivotable in the steering link in a second direction, and wherein the first direction is substantially perpendicular to the second direction.

The disclosed technology further relates to a beach wagon, wherein the floor assembly comprises a first floor assembly pivotal with respect to the first end assembly, and a second floor assembly pivotal with respect to the second end assembly, and wherein the first floor assembly is pivotable with respect to the second floor assembly to allow for folding of the wagon frame.

The disclosed technology further relates to a beach wagon, further comprising a linkage assembly under the floor assembly, the linkage assembly having a first linkage pivotally connected to the first end assembly and a second linkage pivotally connected to the second end assembly, wherein the first linkage is also pivotally connected to the second linkage.

The disclosed technology further relates to a beach wagon, wherein the wagon frame folds between an open configuration and a folded configuration.

The disclosed technology further relates to a beach wagon, wherein the first and second front wheels are both rotatably and pivotally connected to the wagon frame adjacent the first end assembly.

The disclosed technology further relates to a beach wagon, further comprising: a steering link pivotally connected to the wagon frame adjacent the first end assembly; a handle pivotally connected to the steering link; and, a tie rod connected to the steering link, the tie rod having a first end connected to the first front wheel and a second end connected to the second front wheel, wherein the tie rod moves laterally as the steering link is pivoted by the handle to pivot the first and second front wheels for turning the wagon.

The disclosed technology further relates to a beach wagon, wherein the wagon frame comprises a first end assembly and an opposing second end assembly, a first floor assembly pivotal with respect to the first end assembly, a second floor assembly pivotal with respect to the second end assembly, and wherein the first floor assembly is pivotable with respect to the second floor assembly to allow for folding of the wagon frame.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

DETAILED DESCRIPTION

While this disclosure is susceptible of embodiments in many different forms, there is shown in the drawings and will herein be described in detail preferred embodiments with the understanding that the present disclosure is to be considered as an exemplification of the principles of the disclosure and is not intended to limit the broad aspect of the disclosure to the embodiments illustrated. It should be noted that the features illustrated in the drawings are not necessarily drawn to scale, and features of one embodiment may be employed with other embodiments as one of ordinary skill in the relevant art would recognize, even if not explicitly stated herein. Further, descriptions of well-known components and processing techniques may be omitted so as to not unnecessarily obscure the embodiments of the present disclosure. The examples used herein are intended merely to facilitate an understanding of ways in which the present disclosure may be practiced and to further enable those of ordinary skill in the art to practice the embodiments of the present disclosure. Accordingly, the examples and embodiments herein should not be construed as limiting the scope of the present disclosure, which is defined solely by the appended claims and applicable law. Moreover, it is noted that like reference numerals represent similar parts throughout the several views of the drawings of the disclosure.

Figure 1:
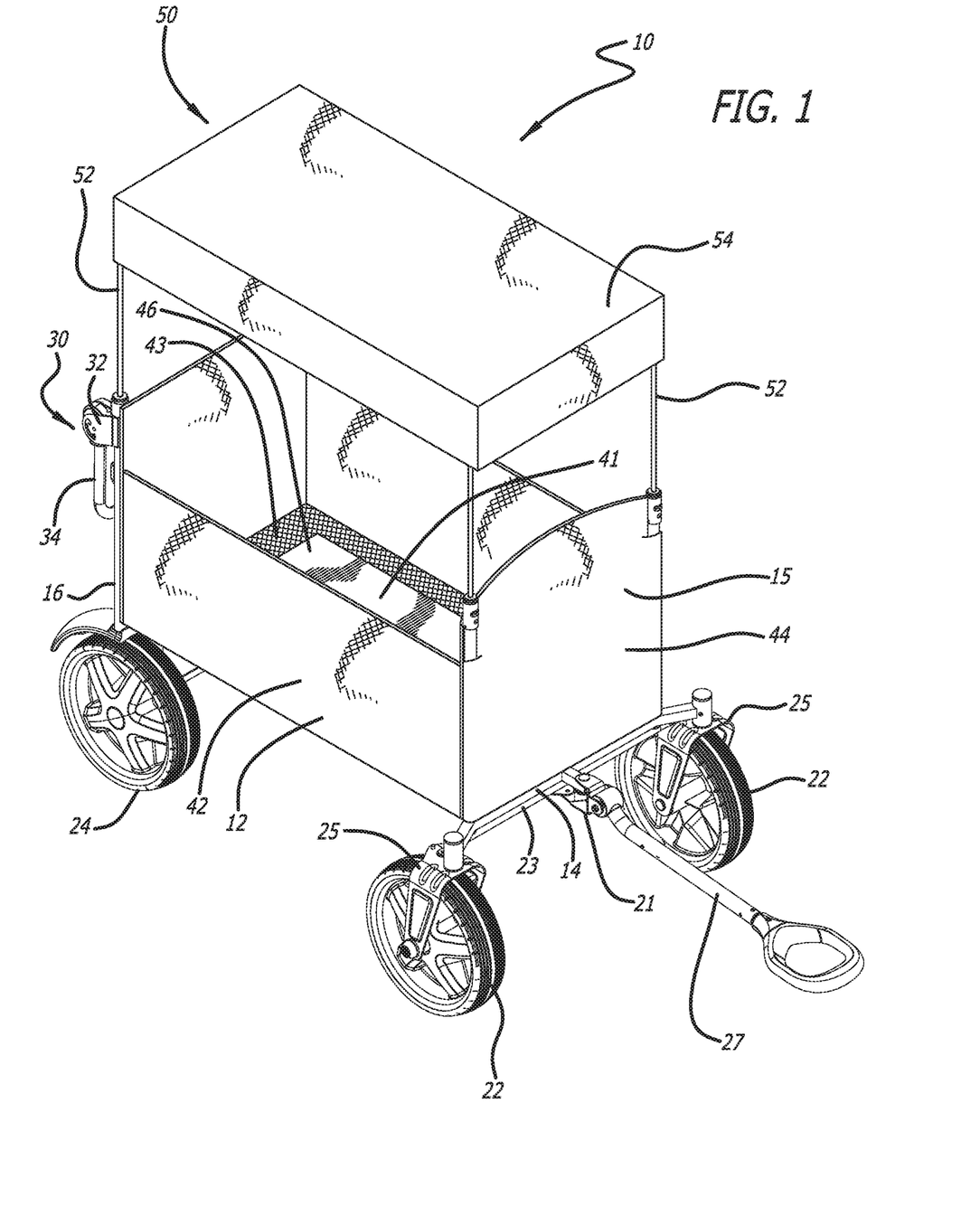
FIG. 1 is a perspective view of a foldable beach wagon according to one embodiment, showing the foldable beach wagon in an open, unfolded or use configuration.
Figure 2:
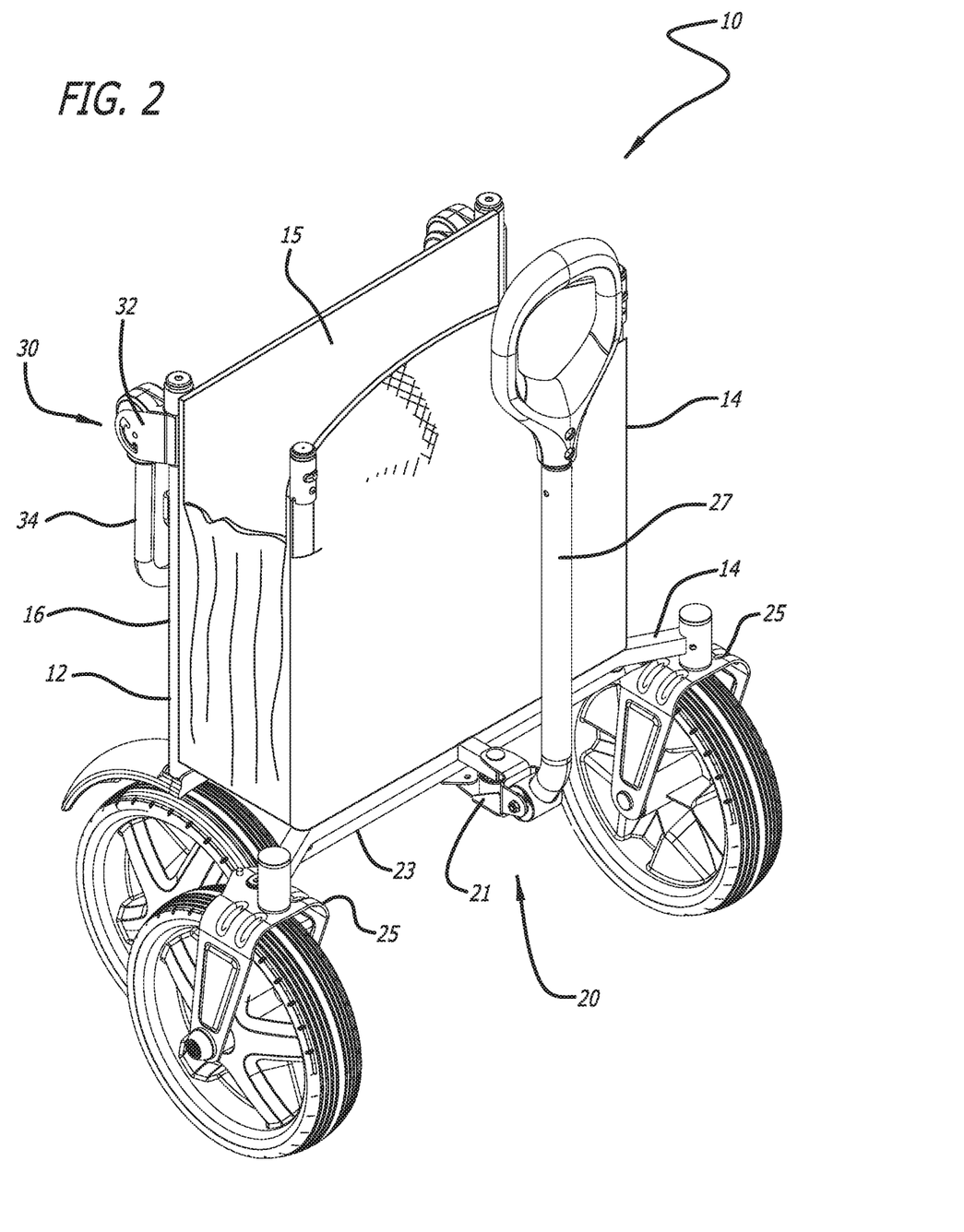
FIG. 2 is a perspective view of the foldable beach wagon of FIG. 1, showing the foldable beach wagon in a folded configuration.
Figure 5:
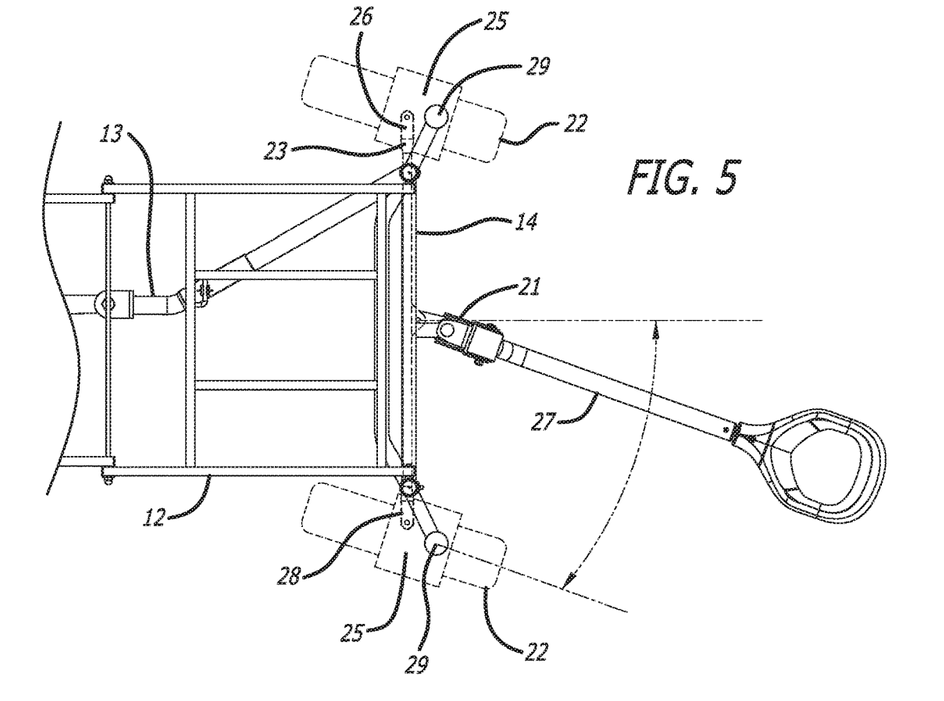
FIG. 5 is a partial top plan view of a steering assembly of the foldable beach wagon of FIG. 1, with the front wheels in a right turning position.
Figure 6:
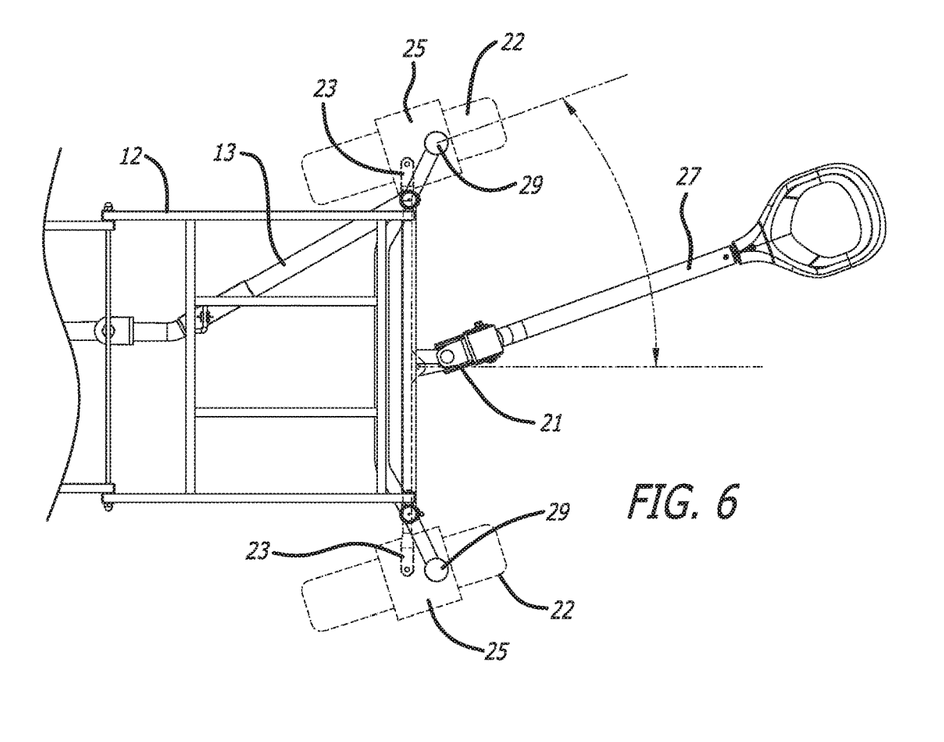
FIG. 6 is a partial top plan view of a steering assembly of the foldable beach wagon of FIG. 1, with the front wheels in a left turning position.

Referring now to the figures, and initially to FIGS. 1 and 2, in various embodiments a foldable wagon 10 includes a collapsible frame assembly 12 such that the foldable wagon 10 with its collapsible frame assembly 12 is moveable between an unfolded, open or use configuration (FIGS. 1 and 3-9) and a closed, collapsed or folded configuration (FIG. 2). In one embodiment, the frame assembly 12 includes a first (or forward) end assembly 14, an opposing second (or rearward) end assembly 16 opposing the first end assembly 14, a floor assembly 11 connected to the wagon frame 12 between the first end assembly 14 and the second end assembly 16, and a linkage assembly 13. In one embodiment, the floor assembly 11 comprises a first floor assembly pivotal with respect to the first end assembly 14, and a second floor assembly pivotal with respect to the second end assembly 16. Further, the first floor assembly is pivotable with respect to the second floor assembly to allow for folding of the wagon frame 12 as shown in FIG. 2. In one embodiment, the wagon frame 12 further comprises a linkage assembly 13 under the floor assembly 11, as shown in FIGS. 5 and 6. The linkage assembly 13 has a first linkage pivotally connected to the first end assembly 14 and a second linkage pivotally connected to the second end assembly 16.

Additionally, the first linkage is also pivotally connected to the second linkage. In various embodiments the foldable wagon 10 includes a flexible housing 15, such as a fabric housing, connected to the foldable frame assembly 12. In one embodiment the foldable wagon 10 is a beach wagon.

In various embodiments, the foldable wagon 10 includes two front wheels 22 (i.e., a first front wheel 22 and a second front wheel 22) rotatably and pivotally connected to the wagon frame 12 adjacent the first end assembly 14, and in various embodiments preferably connected to a steering assembly 20 as shown in FIGS. 1 and 3-6. The foldable wagon 10 also has two rear wheels 24 (i.e., a first rear wheel 24 and a second rear wheel 24) rotatably connected to the wagon frame 12 adjacent the second end assembly 16. In some embodiments, pivotable caster assemblies may be utilized in connection with the two front wheels 22, typically without a steering assembly.

Figure 3A:
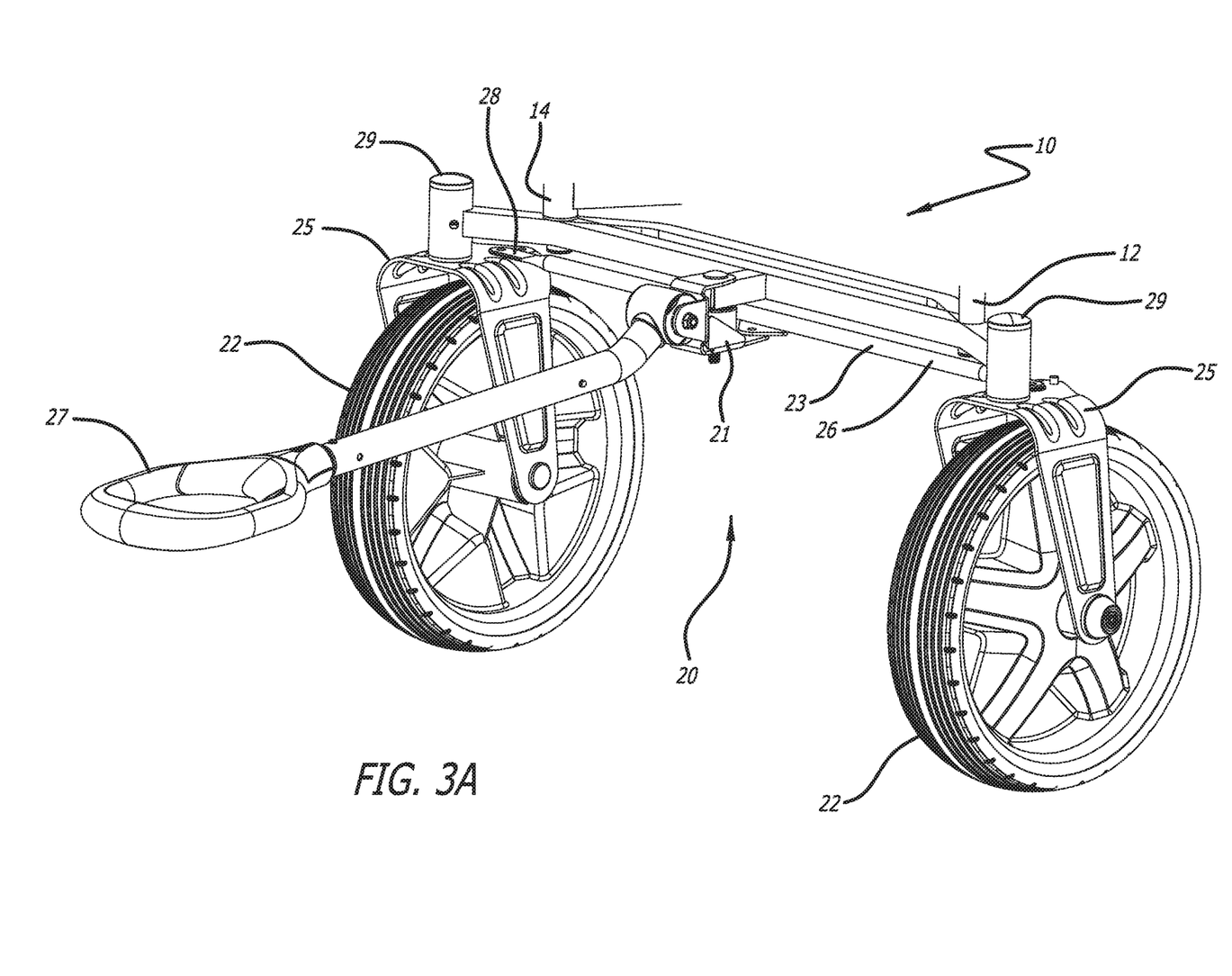
FIG. 3A is a partial front perspective view of one embodiment of a steering assembly of the foldable beach wagon of FIG. 1, with the front wheels in the forward position.
Figure 3B:
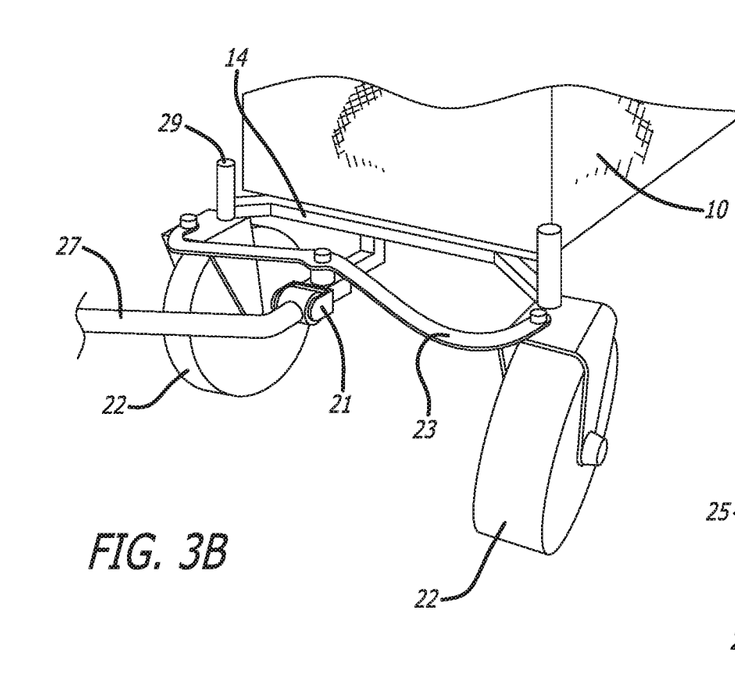
FIG. 3B is a partial front perspective view of another embodiment of a steering assembly of the foldable beach wagon of FIG. 1, with the front wheels in the forward position.
Figure 3C:
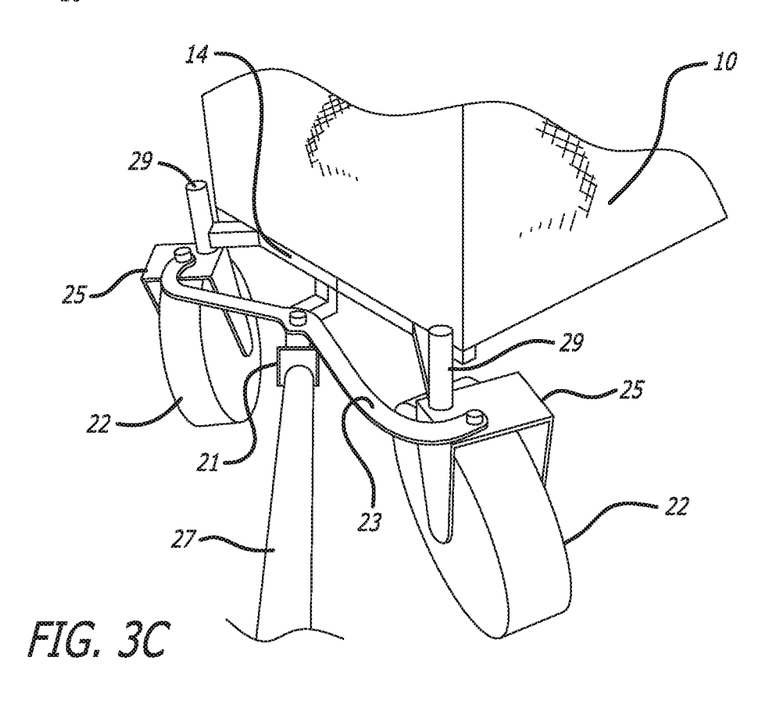
FIG. 3C is a partial front perspective view of the steering assembly of the foldable beach wagon of FIG. 3B, with the front wheels in a turned position.
Figure 4:
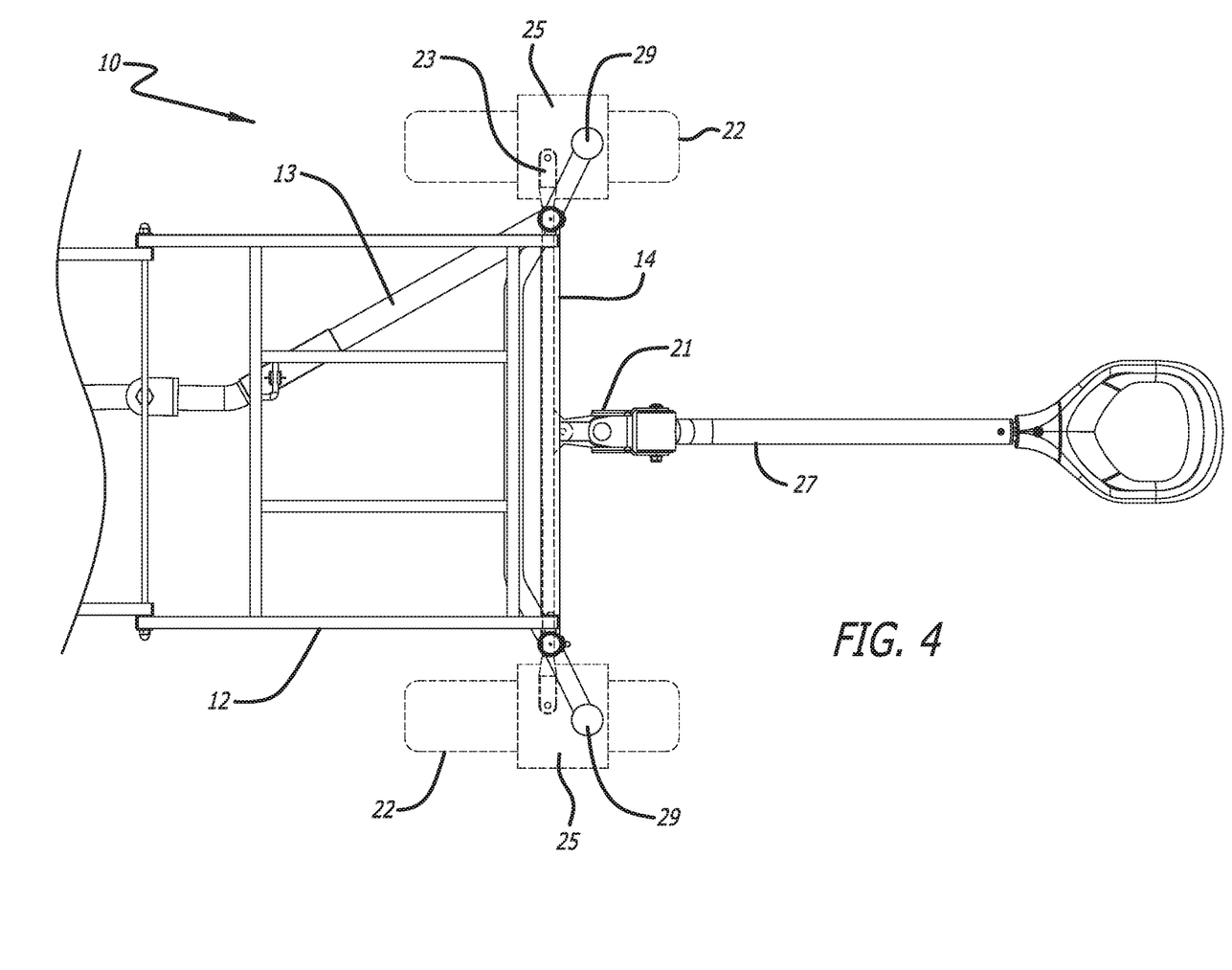
FIG. 4 is a partial top plan view of a steering assembly of the foldable beach wagon of FIG. 1, with the front wheels in the forward position.

In one embodiment, the steering assembly 20 generally comprises a steering link 21 pivotally connected to the first end assembly 14, a tie rod 23 connected to and driven by the steering link 21, a steering knuckle 25 pivotally connected at each side of the first end assembly 14, and a handle 27 pivotally connected to the steering link 21 as shown in FIGS. 3B and 3C. The tie rod 23 is connected at opposing ends to the steering knuckles 25, and the front wheels 22 are rotatably connected, respectively, to the steering knuckles 25. When the handle 27 is moved in a lateral direction, the steering link 21 will pivot with the handle 27 and cause the tie rod 23 to move laterally in the direction of the handle 27 movement. Further, the tie rod 23 will simultaneously pivot each of the steering knuckles 25 about respective axles 29, which results in the turning of the front wheels 22 to turn the wagon 10. Thus, the front wheels 22 will turn in the direction pulled by the user. In one embodiment, the tie rod 23 is curved to allow the tie rod 23 to reach around the axles 29 of the knuckles 25 for increased range of motion as shown in FIGS. 3B and 3C.

An alternate embodiment of the steering assembly 20 is shown in FIGS. 3A and 4-6. In this embodiment the steering assembly 20 generally comprises a steering link 21 pivotally connected to the wagon frame 12 adjacent first end assembly 14, a tie rod 23 connected to and driven by the steering link 21, a steering knuckle 25 pivotally connected at each side of the first end assembly 14, and a handle 27 pivotally connected to the steering link 21. The tie rod 23 is connected at opposing ends to the steering knuckles 25, and the front wheels 22 are rotatably connected, respectively, to the steering knuckles 25. Thus, the first end 26 of the tie rod 23 is connected to the first front wheel 22 and the second end 28 of the tie rod 23 is connected to the second front wheel 22. The steering link 21 is thus pivotable in a first direction and the handle 27 is generally pivotable in the steering link 21 in a second direction that is substantially perpendicular to the first direction. When the handle 27 is moved or pivoted in a lateral direction, the steering link 21 will pivot with the handle 27 and cause the tie rod 23 to move laterally in the direction of the handle 27 movement. Further, the tie rod 23 will simultaneously pivot each of the steering knuckles 25 about respective axles 29, which results in the turning of the front wheels 22 to turn the wagon 10. Thus, the front wheels 22 will turn in the direction pulled by the user. In this embodiment the tie rod 23 is generally straight.

Figure 7:
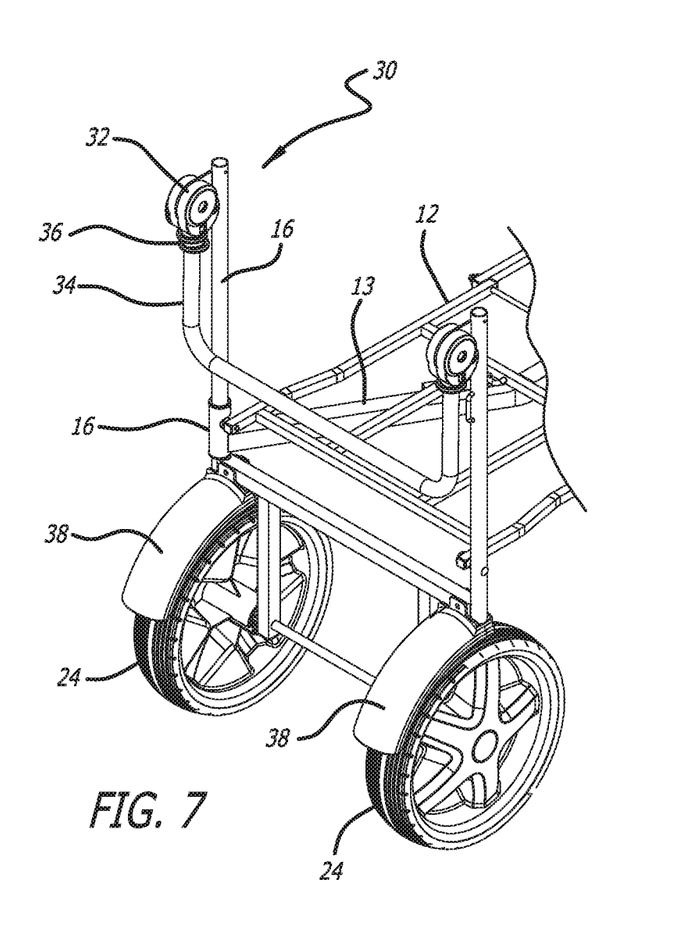
FIG. 7 is a partial rear perspective view of a chair hanger of the foldable beach wagon of FIG. 1, with the chair hanger in the folded position.
Figure 8:
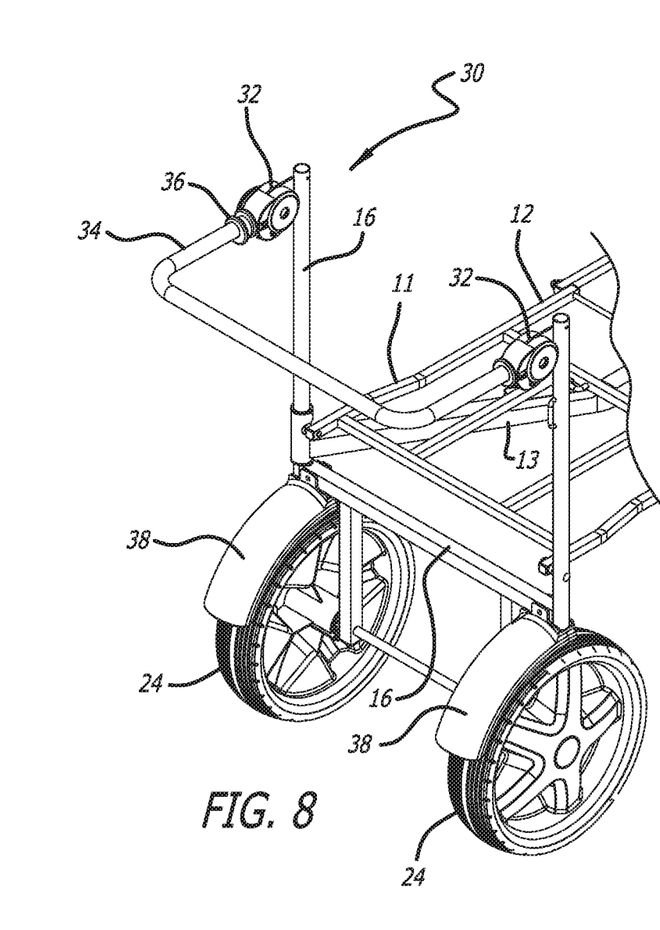
FIG. 8 is a partial rear perspective view of a chair hanger of the foldable beach wagon of FIG. 1, with the chair hanger in an unfolded or open position.
Figure 9:
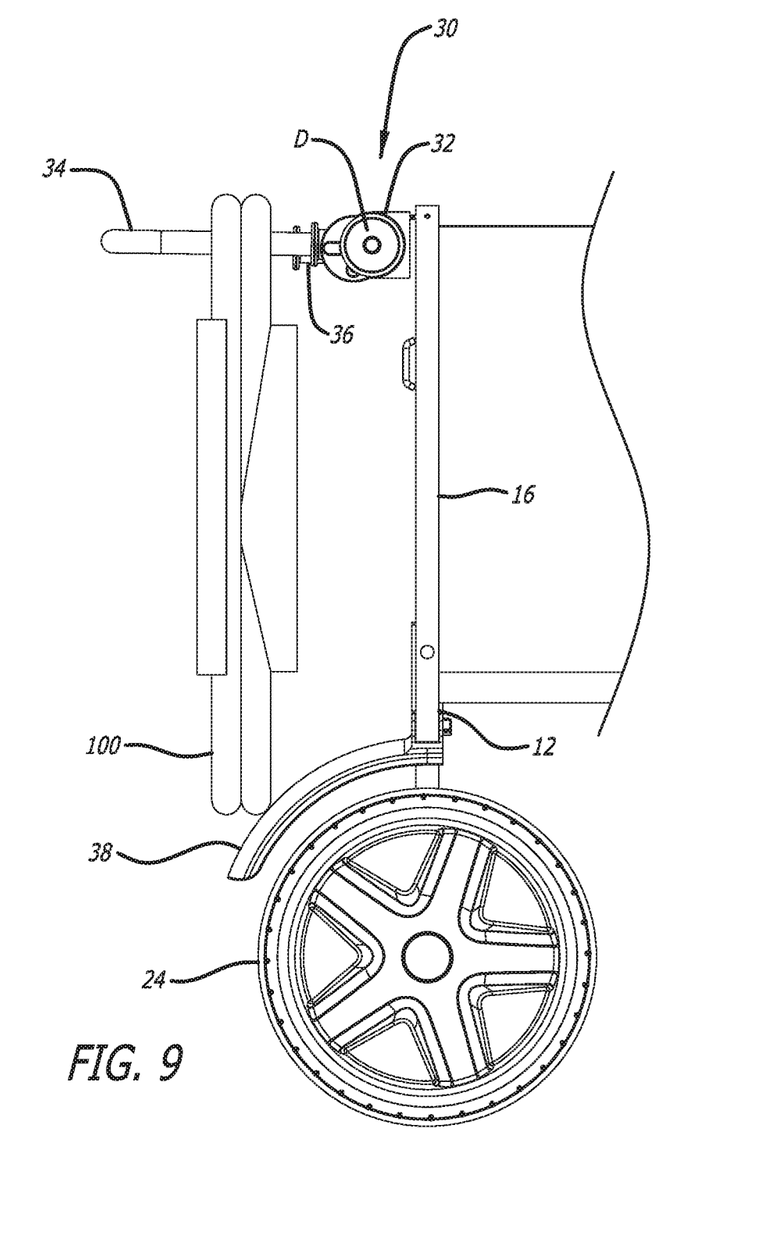
FIG. 9 is a partial side elevation view of the foldable beach wagon of FIG. 8 showing chairs mounted on the chair hanger and the chairs engaged with fenders over rear wheels of the folding beach wagon to block contact of the chairs with the rear wheels.

In various embodiments, the foldable wagon 10 includes a hanger assembly 30 for supporting and carrying one or more chairs 100 (or other items) with movement of wagon 10 as shown in FIG. 9. In one embodiment, the hanger assembly 30 is connected to the wagon frame 12 adjacent the second end assembly 16, and is adapted to receive one or more chairs 100. The hanger assembly 30 comprises a pivot mount 32 connected to the wagon frame 12 and a hangar bar 34 to support one or more chairs. The pivot mount 32 in connection with the hangar bar 34 can lock the hangar bar 34 in a collapsed position, as shown in FIGS. 1 and 7, and a support position, as shown in FIGS. 8 and 9. In one embodiment the hangar bar 34 is a U-bar 34. The pivot mount 32 allows the hangar bar 34 to pivot about axis D. In an alternate embodiment, the hangar bar 34 has spring-biased locking sleeves 36 coupled to opposing ends of the U-bar 34 as shown in FIGS. 7 and 8. The U-bar 34 is pivotable about axis D from a collapsed position extending substantially along the second end assembly 16 (FIG. 7) and a support position extending outward from the second end assembly 16 (FIG. 8). The locking sleeves 36 may slide along the U-bar 34 and engage with the mounts 32 to hold the U-bar 34 in the support position. In such an embodiment the user moves the locking sleeves 36 away from the mounts 32 to disengage a locking member from a receiver and pivot the U-bar 34 from the support position to the collapsed position, where the locking member will engage a second receiver to lock in place. In alternate embodiment, locking sleeves are not necessary to pivot the U-bar and to lock it in the collapsed and support positions. In some embodiments, the U-bar 34 can also be used as a lifting handle in the support position. The chair hanger assembly 30 is configured to support one or more chairs 100 in the support position as shown in FIGS. 8 and 9.

In a preferred embodiment, a first fender 38 is provided over the first rear wheel 24 and a second fender 38 is provided over the second rear wheel 24 to block engagement of the one or more chairs with the rear wheels 24 of the wagon 10. In one embodiment the fenders 38 are coupled to the wagon frame 12 adjacent the second end assembly 16.

Figure 10:
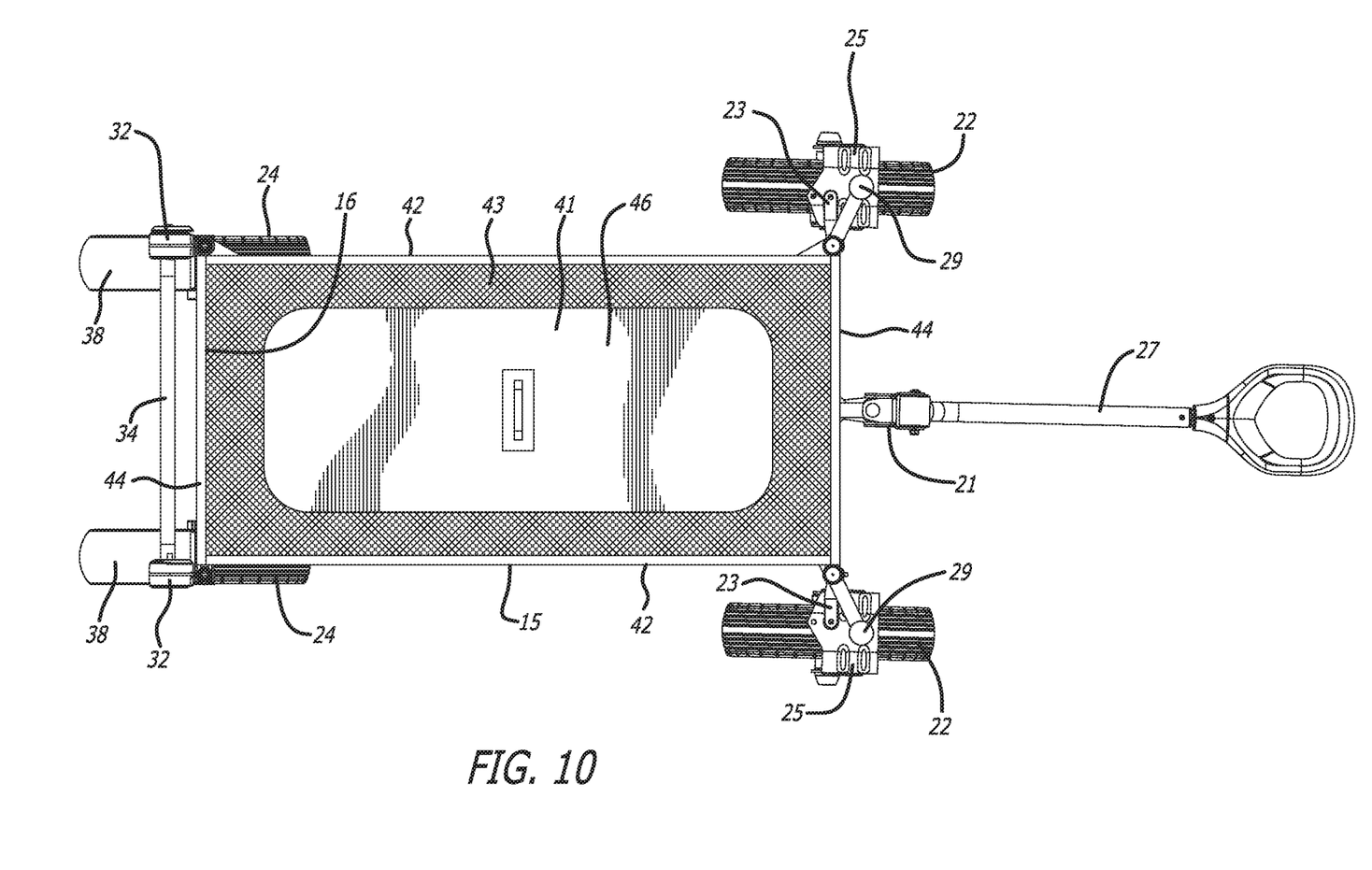
FIG. 10 is a top plan view of a bottom wall of a fabric housing of the foldable beach wagon of FIG. 1 showing that the bottom wall includes a central panel and a perimeter panel extending around the central panel and suggesting that the perimeter panel is formed of a porous material to allow sand to pass through the perimeter panel.

In various embodiments, the flexible housing 15 includes side portions 42, end portions 44, and a bottom wall 46 as best shown in FIGS. 1 and 10. The side portions 42 extend between the first and second end assemblies 14, 16, and the end portions 44 extend along the first and second end assemblies 14, 16, respectively. Thus, the side portions 42 and end portions 44 are also referred to herein as a flexible wall housing as they extend around the outer perimeter of the frame of the wagon. The bottom wall 46, also referred to as the flexible floor housing 46, extends on top or over the floor assembly 11 of the frame 12. The flexible floor housing 46 preferably includes a central panel 41 and a perimeter panel 43. The perimeter panel 43 or perimeter 43 extends around the central panel 41 and from the central panel 41 to the side portions 42 and end portions 44. In the illustrative embodiment, the perimeter panel 43 is formed of a porous material, such as a screen, configured to allow debris, such as sand, to pass through the perimeter panel 43.

In one embodiment, the wagon 10 also has a canopy assembly 50. The wagon frame 12 may include telescoping canopy posts 52 that removably connect to a canopy 54 as shown in FIG. 1.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying Claims.

Further, the claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A foldable beach wagon comprising:
    a wagon frame having a first end assembly and an opposing second end assembly;
    a floor assembly connected to the wagon frame between the first end assembly and the second end assembly, wherein the wagon frame folds between an open configuration and a folded configuration;
    first and second rear wheels rotatably connected to the wagon frame adjacent the second end assembly;
    first and second front wheels rotatably connected to the wagon frame adjacent the first end assembly;
    a hanger assembly connected to the wagon frame adjacent the second end assembly, the hangar assembly adapted to receive one or more chairs;
    a first fender over the first rear wheel and a second fender over the second rear wheel to block engagement of the one or more chairs with the rear wheels of the wagon; and,
    a flexible wall housing around the frame of the wagon, and a flexible floor housing over the floor assembly, wherein the flexible floor housing has a screen around a perimeter thereof to allow sand to filter therethrough.

2. The wagon of claim 1, further comprising a steering link pivotally connected to the wagon frame adjacent the first end assembly, a handle pivotally connected to the steering link, and a tie rod connected to the steering link, the tie rod having a first end connected to the first front wheel and a second end connected to the second front wheel, wherein the tie rod moves laterally as the steering link is pivoted by the handle to pivot the first and second front wheels for turning the wagon.

3. The wagon of claim 2, wherein the steering link is pivotable in a first direction, wherein the handle is pivotable in the steering link in a second direction, and wherein the first direction is substantially perpendicular to the second direction.

4. The wagon of claim 1, wherein the hangar assembly comprises a hangar bar to support the one or more chairs, and a pivot mount connected to the wagon frame to selectively lock the hangar bar in a collapsed position and in a support position.

5. The wagon of claim 1, further comprising a removable canopy connected to telescoping posts that are secured to the wagon frame.

6. The wagon of claim 1, wherein the floor assembly comprises a first floor assembly pivotal with respect to the first end assembly, and a second floor assembly pivotal with respect to the second end assembly, and wherein the first floor assembly is pivotable with respect to the second floor assembly to allow for folding of the wagon frame.

7. The wagon of claim 6, further comprising a linkage assembly under the floor assembly, the linkage assembly having a first linkage pivotally connected to the first end assembly and a second linkage pivotally connected to the second end assembly, wherein the first linkage is also pivotally connected to the second linkage.

8. A beach wagon comprising:
a wagon frame having a first end assembly and an opposing second end assembly, the wagon frame folding between an open configuration and a folded configuration;
a floor assembly connected to the wagon frame between the first end assembly and the second end assembly;
first and second rear wheels rotatably connected to the wagon frame adjacent the second end assembly;
first and second front wheels rotatably connected to the wagon frame adjacent the first end assembly;
a hanger assembly connected to the wagon frame adjacent the second end assembly, the hangar assembly adapted to receive one or more chairs, wherein the hangar assembly comprises a hangar bar to support the one or more chairs, and a pivot mount connected to the wagon frame to selectively lock the hangar bar in a collapsed position and in a support position, and wherein the hangar bar is pivotable when the wagon frame is in the open configuration; and,
a first fender over the first rear wheel and a second fender over the second rear wheel to block engagement of the one or more chairs with the rear wheels of the wagon.

9. The wagon of claim 8, further comprising a flexible wall housing around the frame of the wagon, and a flexible floor housing over the floor assembly, wherein the flexible floor housing has a screen around a perimeter thereof to allow sand to filter therethrough.

10. The wagon of claim 8, wherein the floor assembly comprises a first floor assembly pivotal with respect to the first end assembly, and a second floor assembly pivotal with respect to the second floor assembly, and wherein the first floor assembly is pivotable with respect to the second floor assembly to allow for folding of the wagon frame.

11. The wagon of claim 8, further comprising a removable canopy connected to telescoping posts that are secured to the wagon frame.

12. The wagon of claim 8, wherein the first and second front wheels are both rotatably and pivotally connected to the wagon frame adjacent the first end assembly.

13. The wagon of claim 12, further comprising:
a steering link pivotally connected to the wagon frame adjacent the first end assembly;
a handle pivotally connected to the steering link; and,
a tie rod connected to the steering link, the tie rod having a first end connected to the first front wheel and a second end connected to the second front wheel, wherein the tie rod moves laterally as the steering link is pivoted by the handle to pivot the first and second front wheels for turning the wagon.

14. A beach wagon comprising:
a wagon frame having a first end and an opposing second end;
first and second rear wheels rotatably connected to the wagon frame adjacent the second end;
first and second front wheels rotatably connected to the wagon frame adjacent the first end;
a hanger assembly connected to the wagon frame adjacent the second end and adapted to receive one or more chairs, wherein the hangar assembly comprises a hanger bar to support the one or more chairs, and a pivot mount connected to the wagon frame to selectively lock the hangar bar in a collapsed position and in a support position;
a flexible wall housing around the wagon frame and flexible floor housing over a floor assembly, wherein the flexible floor housing has a screen around a perimeter thereof to allow sand to filter therethrough; and,
a first fender over the first rear wheel and a second fender over the second rear wheel to block engagement of the one or more chairs with the rear wheels of the wagon.

15. The wagon of claim 14, further comprising:
a steering link pivotally connected to the wagon frame adjacent the first end;
a handle pivotally connected to the steering link; and,
a tie rod connected to the steering link, the tie rod having a first end connected to the first front wheel and a second end connected to the second front wheel, wherein the tie rod moves laterally as the steering link is pivoted by the handle to pivot the first and second front wheels for turning the wagon.

16. The wagon of claim 14, wherein the wagon frame comprises a first end assembly and an opposing second end assembly, a first floor assembly pivotal with respect to the first end assembly, a second floor assembly pivotal with respect to the second end assembly, and wherein the first floor assembly is pivotable with respect to the second floor assembly to allow for folding of the wagon frame.

17. The wagon of claim 14, further comprising a removable canopy connected to telescoping posts that are secured to the wagon frame.

* * * * *